(12) United States Patent
Chen et al.

(10) Patent No.: US 10,678,307 B2
(45) Date of Patent: Jun. 9, 2020

(54) ELECTRONIC DEVICE

(71) Applicants:Wei-Ting Chen, Taipei (TW);
Tzu-Chien Lai, Taipei (TW);
Yen-Hsiao Yeh, Taipei (TW);
Nien-Chen Lee, Taipei (TW); Yi-Chun Lin, Taipei (TW)

(72) Inventors: Wei-Ting Chen, Taipei (TW);
Tzu-Chien Lai, Taipei (TW);
Yen-Hsiao Yeh, Taipei (TW);
Nien-Chen Lee, Taipei (TW); Yi-Chun Lin, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/264,682

(22) Filed: Feb. 1, 2019

(65) Prior Publication Data

US 2019/0250673 A1 Aug. 15, 2019

Related U.S. Application Data

(60) Provisional application No. 62/630,277, filed on Feb. 14, 2018.

(51) Int. Cl.
*G06F 1/16* (2006.01)
(52) U.S. Cl.
CPC .......... *G06F 1/1679* (2013.01); *G06F 1/1616* (2013.01); *G06F 1/1654* (2013.01)
(58) Field of Classification Search
None
See application file for complete search history.

(56) References Cited

U.S. PATENT DOCUMENTS

| | | | | |
|---|---|---|---|---|
| 6,839,576 B2* | 1/2005 | Aagaard | ............... | G06F 1/1616 455/575.1 |
| 7,656,661 B2* | 2/2010 | Shaum | .................. | G06F 1/1616 361/679.55 |
| 8,024,843 B2* | 9/2011 | Endo | ................... | H04M 1/0222 16/303 |
| 8,320,113 B2* | 11/2012 | Xiao | ...................... | G06F 1/162 361/679.27 |

(Continued)

FOREIGN PATENT DOCUMENTS

| | | |
|---|---|---|
| CN | 2812079 | 8/2006 |
| TW | M258508 | 3/2005 |

*Primary Examiner* — Courtney L Smith
*Assistant Examiner* — Rashen E Morrison
(74) *Attorney, Agent, or Firm* — JCIPRNET

(57) ABSTRACT

An electronic device includes a first body, a second body, a base, a first shaft structure, a second shaft structure, and a locking component. The second body is connected to the first body through the base. The first shaft structure includes a first shaft and a second shaft. The second body is pivoted to a first base portion of the base through the first shaft and a second base portion of the base through the second shaft. The second shaft structure includes a connecting component fixed to the first body and a third shaft pivoted to the first base portion and the connecting component. The first and second shafts are perpendicular to the third shaft. The locking component is slidably disposed between the second base portion and the first body and configured to lock or release a connection between the second base portion and the first body.

14 Claims, 18 Drawing Sheets

(56) References Cited

U.S. PATENT DOCUMENTS

| | | | | |
|---|---|---|---|---|
| 9,104,382 B2* | 8/2015 | Chen | ................... | G06F 1/1681 |
| 9,192,061 B2* | 11/2015 | Nakajima | ............ | H05K 5/0017 |
| 9,268,359 B2* | 2/2016 | Chung | ................... | G06F 1/162 |
| 9,329,639 B2* | 5/2016 | Lee | ..................... | G06F 1/1669 |
| 9,383,777 B1* | 7/2016 | Riddiford | ............. | G06F 1/1616 |
| 9,823,717 B2* | 11/2017 | Lin | ........................ | G06F 1/203 |
| 2004/0052044 A1* | 3/2004 | Mochizuki | ............ | G06F 1/1616 |
| | | | | 361/679.15 |
| 2007/0123319 A1* | 5/2007 | Hwang | ................ | G06F 1/1616 |
| | | | | 455/575.1 |
| 2015/0043143 A1* | 2/2015 | Chen | ................... | G06F 1/1681 |
| | | | | 361/679.27 |

* cited by examiner

ELECTRONIC DEVICE

CROSS REFERENCE TO RELATED APPLICATION

This application claims the priority benefit of U.S. provisional application Ser. No. 62/630,277, filed on Feb. 14, 2018. The entirety of the above-mentioned patent application is hereby incorporated by reference herein and made a part of specification.

BACKGROUND

Technical Field

The disclosure relates to an electronic device, and particularly to an electronic device with two degrees of freedom of rotation.

Description of Related Art

Common electronic devices, e.g., a notebook computer, are characterized by portability, instant data processing, multiplexing, and great computation performance and thus have become indispensable in the daily lives of modern people. Generally, two bodies of the notebook computer can only be designed with one degree of freedom of rotation, so that a viewing angle at which a display screen is watched or a direction in which the display screen is watched is rather restricted. For instance, when a user intends to have other people watch the images in the display screen, and if the other people are located opposite to the user, the user has to turn the notebook computer, so that the display screen can face the other people. At this time, the user can not watch the images in the display screen and it becomes harder for the user to perform other operating steps on the notebook computer. Hence, how to improve operating flexibility of the notebook computer to facilitate the user's operation has become the focus of research and development by manufacturers.

SUMMARY

The disclosure provides an electronic device with good operating flexibility.

An electronic device of the disclosure includes a first body, a second body, a base, a first shaft structure, a second shaft structure, and a locking component. The second body is connected to the first body through the base. Here, the base includes a first base portion and a second base portion opposite to each other, the first base portion has a first side and a second side intersecting the first side, and the second base portion has a third side and a fourth side intersecting the third side. The first shaft structure includes a first shaft and a second shaft, and the second body is pivoted to the first side of the first base portion through the first shaft and is pivoted to the third side of the second base portion through the second shaft. The second shaft structure includes a connecting component and a third shaft. The connecting component is fixed to the first body, and the third shaft is pivoted to the second side of the first base portion and the connecting component. The first shaft and the second shaft are perpendicular to the third shaft. The locking component is slidably disposed between the fourth side of the second base portion and the first body and configured to lock or release a connection between the second base portion and the first body.

In an embodiment of the disclosure, the electronic device further includes a first magnetic component and a second magnetic component. The first magnetic component is disposed in the second base portion. Here, the second base portion is configured with a first latching slot and the first magnetic component is aligned to the first latching slot. The locking component is a magnetic latch slidably disposed in the first latching slot and configured to be subject to a magnetic attraction force of the first magnetic component so as to be positioned in the first latching slot. The second magnetic component is disposed in the first body. Here, the first body is configured with a second latching slot facing the fourth side of the second base portion, and the second magnetic component is aligned to the second latching slot. When the second base portion is rotated with the second body and aligns the first latching slot to the second latching slot, a magnetic attraction force produced by the second magnetic component to the magnetic latch is greater than a magnetic attraction force produced by the first magnetic component to the magnetic latch, such that a portion of the magnetic latch is moved out of the first latching slot and moved into the second latching slot to lock the connection between the second base portion and the first body.

In an embodiment of the disclosure, a length of the magnetic latch is less than or equal to a depth of the first latching slot of the second base portion, and the length of the magnetic latch is greater than a depth of the second latching slot of the first body.

In an embodiment of the disclosure, the magnetic latch has a first end portion and a second end portion opposite to each other, the first end portion faces the first magnetic component, and the second end portion faces the second magnetic component. When the magnetic latch is attracted by the second magnetic component, the second end portion is moved out of the first latching slot and moved into the second latching slot, and the first end portion is located in the first latching slot.

In an embodiment of the disclosure, the electronic device further includes a switch button movably disposed at the first body and connected to the second magnetic component, and configured to drive the second magnetic component to be misaligned with the second latching slot or to be aligned to the second latching slot.

In an embodiment of the disclosure, the electronic device further includes a link having a connecting end and a latching end, wherein the third shaft has a pivoting portion located in the connecting component and the connecting end is connected to the pivoting portion. The latching end is slidably disposed in the first body, and the second body is configured with a latching hole corresponding to the latching end. When the second body and the base are rotated relative to the connecting component and the first body through the third shaft, the pivoting portion of the third shaft rotates relative to the connecting component, such that the connecting end drives at least one portion of the latching end to be moved out of the first body and inserted into the latching hole of the second body.

In an embodiment of the disclosure, the first body has a first edge and a sliding groove connected to the first edge, and the sliding groove is configured to accommodate the latching end. The second body has a second edge corresponding to the first edge, the latching hole is connected to the second edge, and a rotation axis of the third shaft is extended to pass through the first edge and the second edge. After the second body and the base are rotated relative to the connecting component and the first body through the third shaft and aligns the second edge to the first edge, the latching hole is aligned to the sliding groove.

In an embodiment of the disclosure, the locking component has a switch portion slidably connected to the fourth side of the second base. The first body is configured with a first latching portion corresponding to the fourth side of the second base portion, and the switch portion is configured with a second latching portion facing the first body and configured to be latched to or separated from the first latching portion.

In an embodiment of the disclosure, the electronic device further includes a positioning plate and a pushing shaft. The positioning plate is fixed in the second base portion. The pushing shaft is movably disposed in the second base portion, wherein the pushing shaft has a first sliding end, a second sliding end opposite to the first sliding end, and a pivoting end located between the first sliding end and the second sliding end, and the locking component further has an extending portion connected to the switch portion. The extending portion is located in the second base portion, wherein the first sliding end is slidably connected to the extending portion, and the pivoting end is pivoted to the positioning plate. The second sliding end is slidably connected to the positioning plate and connected to the second shaft.

In an embodiment of the disclosure, the electronic device further includes a connecting base that includes a fixing portion and a sleeve portion. The fixing portion is fixed to the second body, and the sleeve portion and the second base portion are arranged side by side. The second shaft movably passes through the second base portion and the sleeve portion of the connecting base.

In an embodiment of the disclosure, the second shaft includes a first shaft portion and a second shaft portion. The sleeve portion has a first hole cooperating with the first shaft portion and a second hole cooperating with the second shaft portion, and the first hole communicates with the second hole. When the first shaft portion passes through the first hole, and the second shaft portion is located outside the second hole, the second body has a degree of freedom for rotating relative to the base. When the second shaft portion passes through the second hole, the second body is prevented from rotating relative to the base.

In an embodiment of the disclosure, the first side of the first base portion and the third side of the second base portion are arranged side by side, and the second side of the first base portion and the fourth side of the second base face the second body.

In an embodiment of the disclosure, the first side of the first base portion and the third side of the second base portion face the second body, and the second side of the first base portion and the fourth side of the second base are arranged side by side.

In an embodiment of the disclosure, the base has a first groove, and the first body has a second groove corresponding to the first groove. When the second body and the base cover the first body, the first groove and the second groove are aligned with each other and constitute an accommodation groove.

In view of the above, the two bodies of the electronic device of the disclosure may be rotated in two different axial directions, and thus the electronic device has good operating flexibility and can satisfy various operating needs of users.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
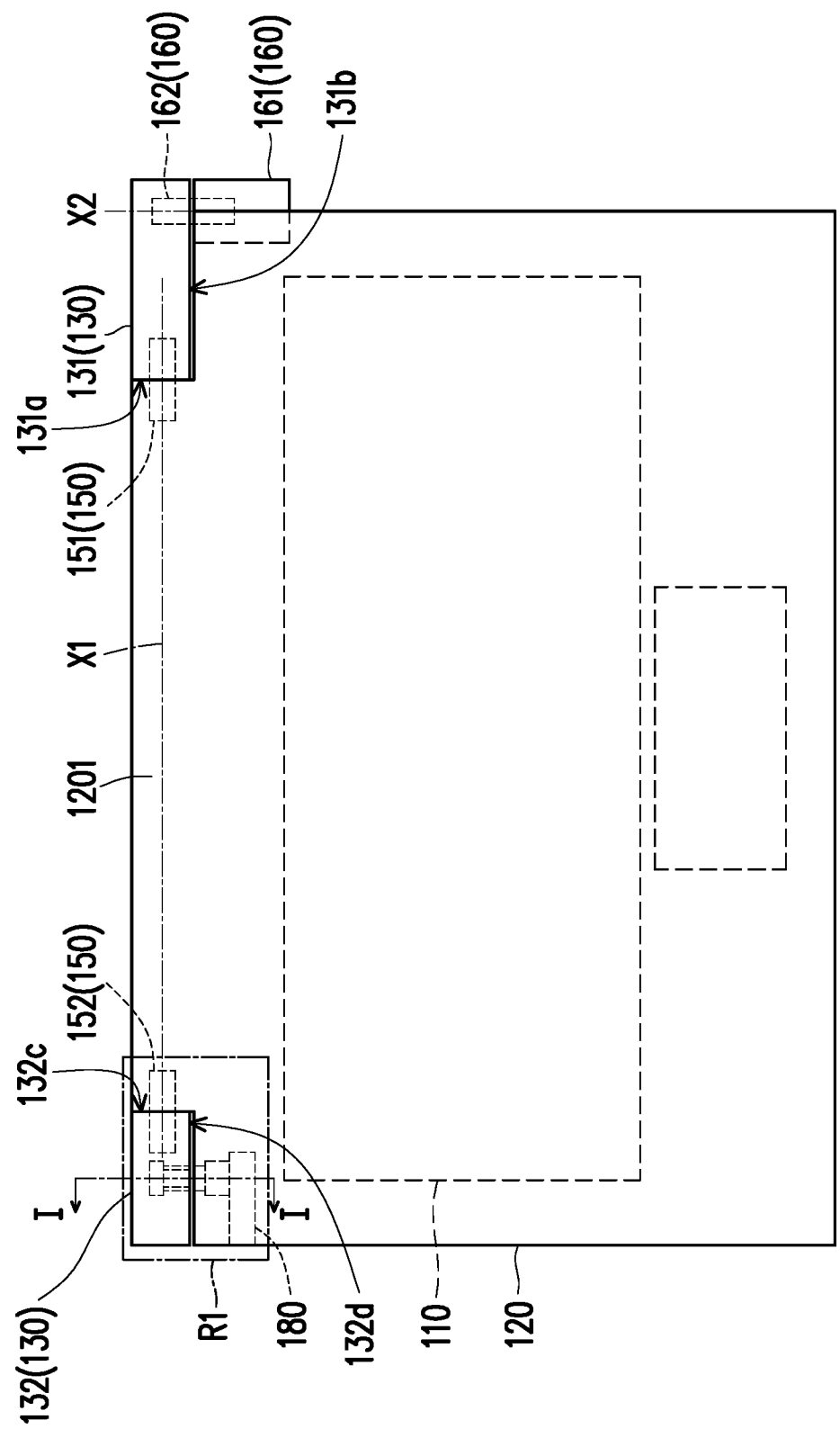
FIG. 1A is a schematic view of an electronic device of a first embodiment of the disclosure.
Figure 1B:
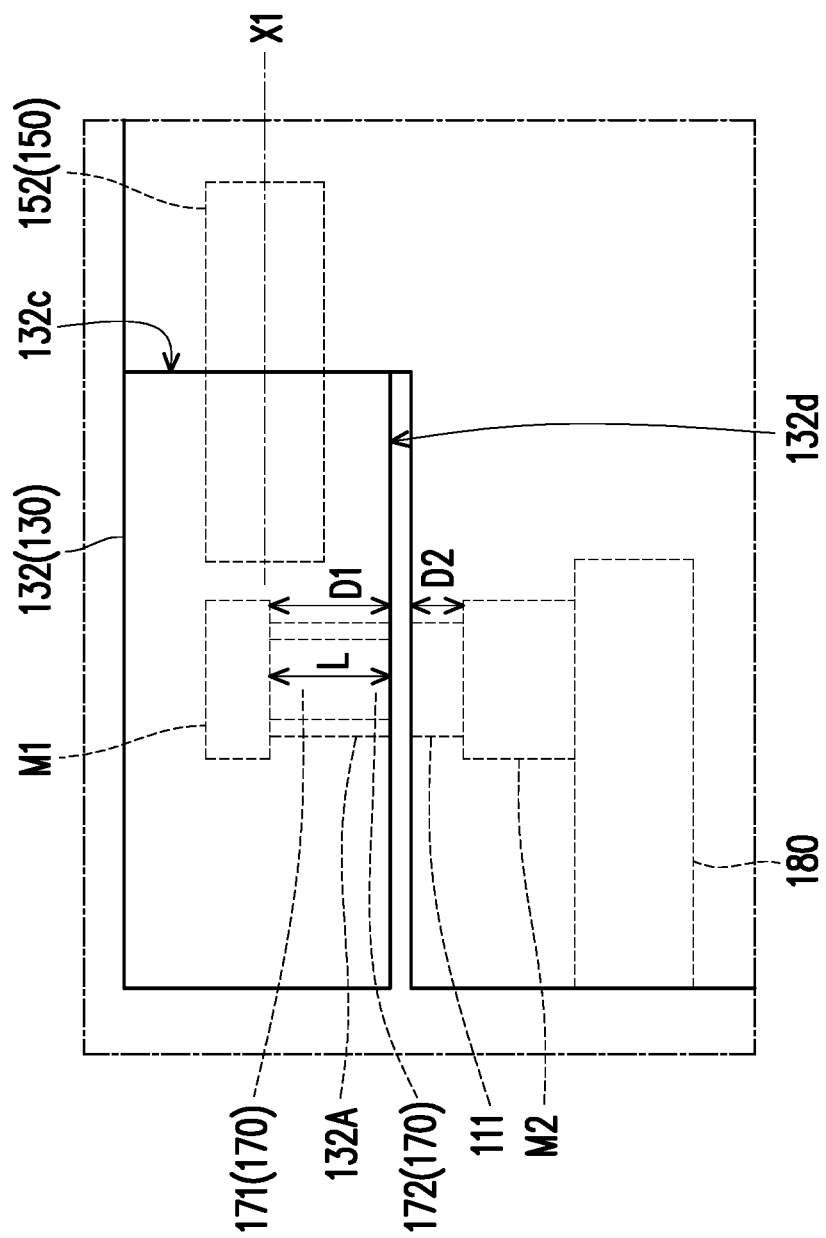
FIG. 1B is a schematic enlarged view of a region R1 in FIG. 1A.
Figure 2:
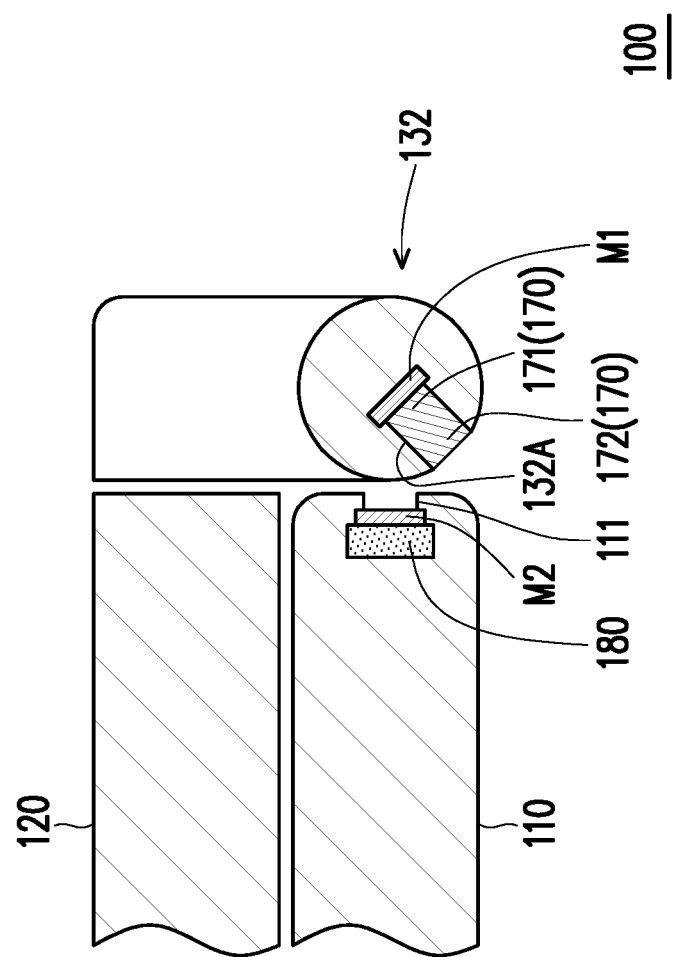
FIG. 2 is a schematic partial cross-sectional view illustrating the electronic device depicted in FIG. 1A along a sectional line I-I.
Figure 3:
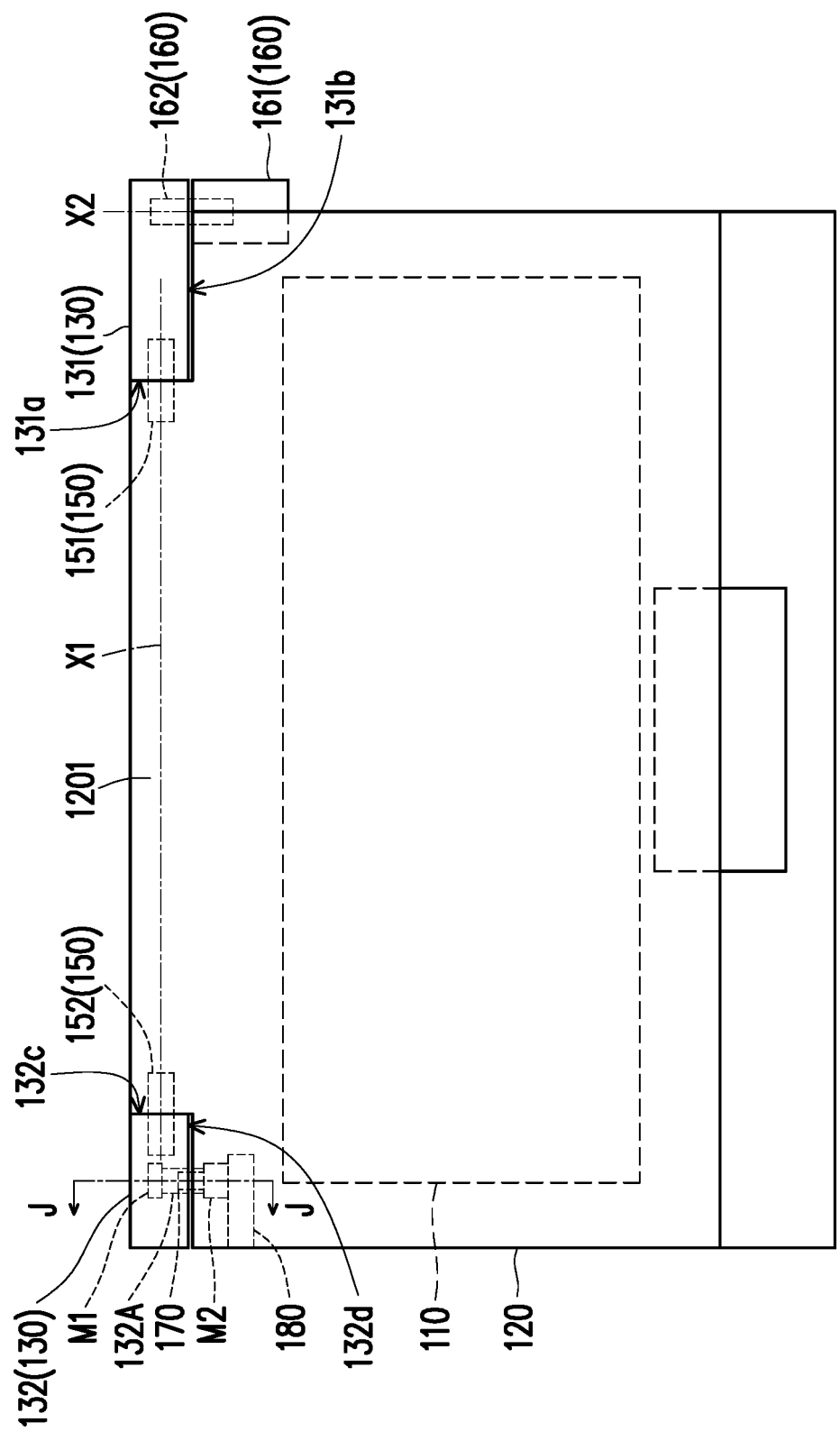
FIG. 3 is a schematic view illustrating the second body depicted in FIG. 1A which is rotated relative to the first body around a first axis and unfolded.
Figure 4:
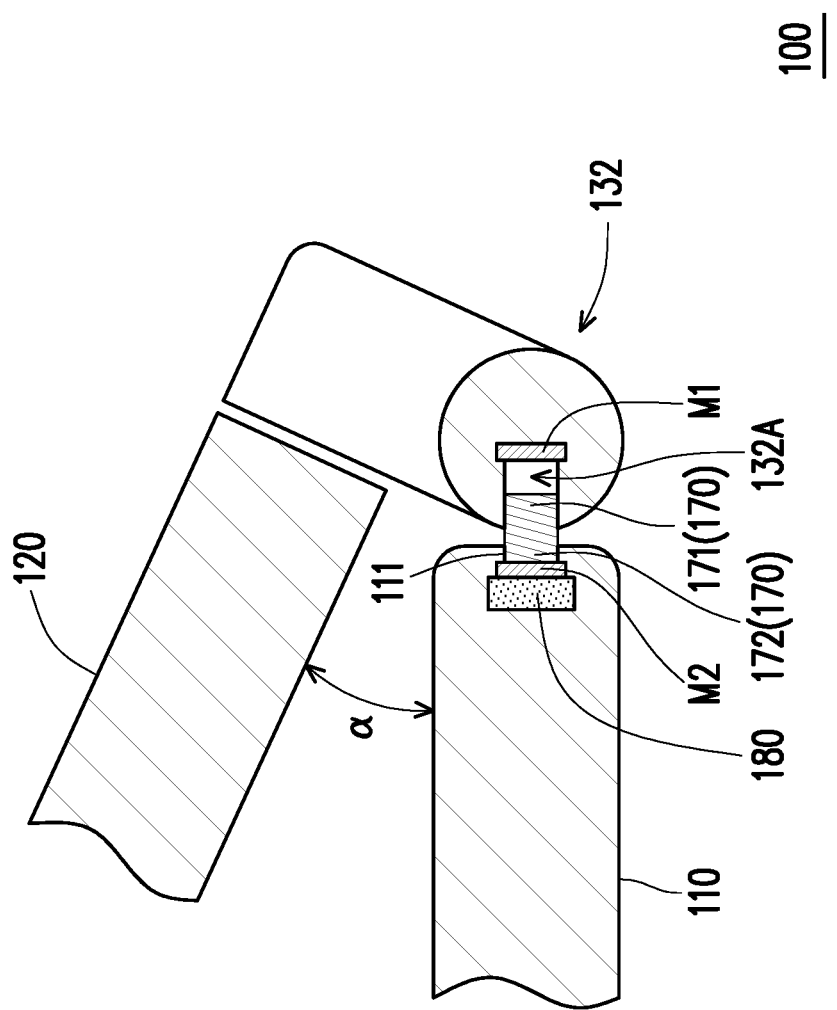
FIG. 4 is a schematic partial cross-sectional view of the electronic device depicted in FIG. 3 along a sectional line J-J.
Figure 5:
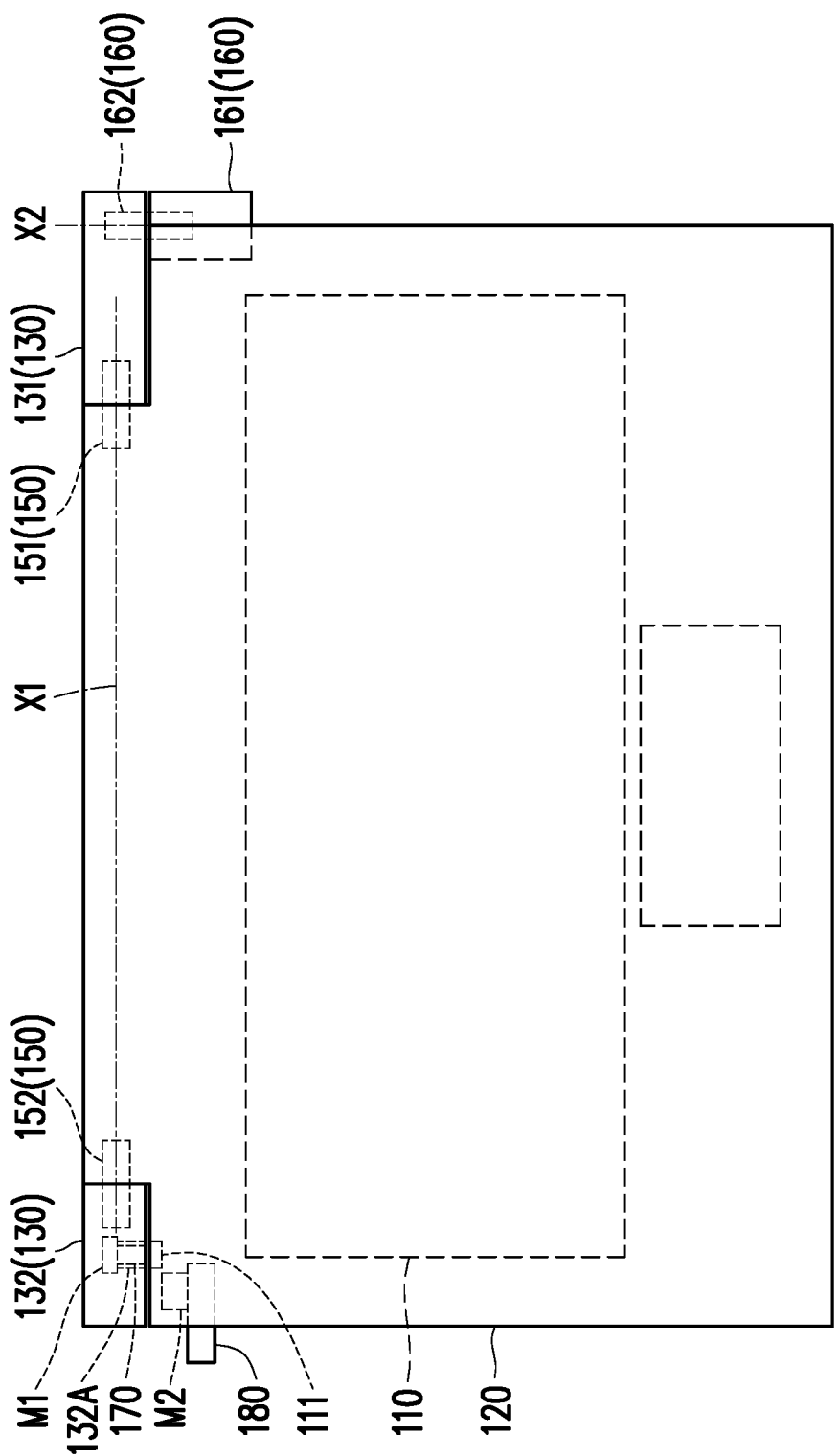
FIG. 5 is a schematic view illustrating the connection between the second base portion and the first body depicted in FIG. 1A is released.
Figure 6:
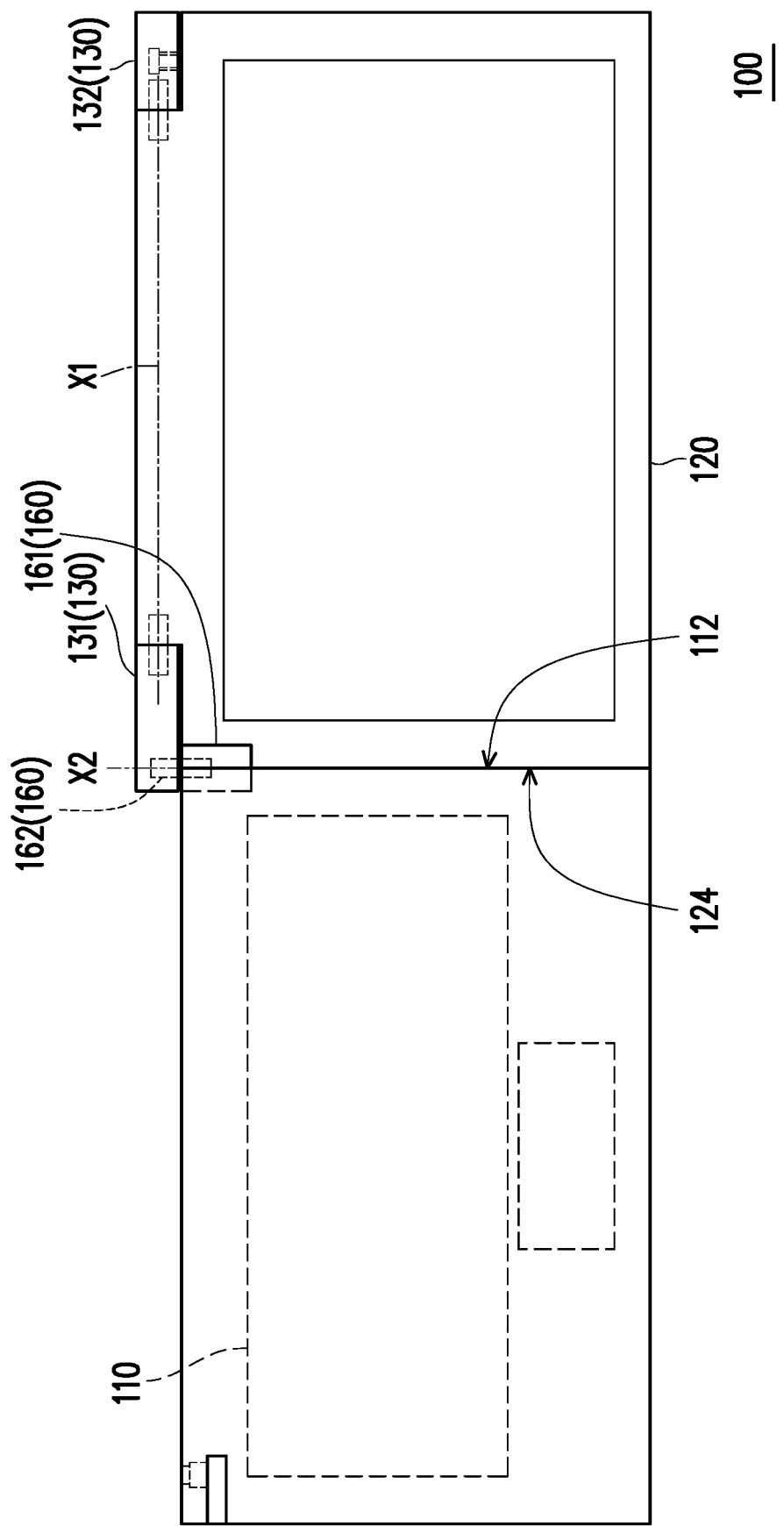
FIG. 6 is a schematic view illustrating the second body and the base depicted in FIG. 1A which are rotated relative to the first body around a second axis and unfolded.

FIG. 1A is a schematic view of an electronic device of a first embodiment of the disclosure. FIG. 1B is a schematic enlarged view of a region R1 in FIG. 1A. FIG. 2 is a schematic partial cross-sectional view illustrating the electronic device depicted in FIG. 1A along a sectional line I-I. FIG. 3 is a schematic view illustrating the second body depicted in FIG. 1A which is rotated relative to the first body around a first axis and unfolded. FIG. 4 is a schematic partial cross-sectional view of the electronic device depicted in FIG. 3 along a sectional line J-J. FIG. 5 is a schematic view illustrating the connection between the second base portion and the first body depicted in FIG. 1A is released. FIG. 6 is a schematic view illustrating the second body and the base depicted in FIG. 1A which are rotated relative to the first body around a second axis and unfolded. In FIG. 1A, FIG. 1B, FIG. 3, FIG. 5, and FIG. 6, it should be mentioned that components located in a body 110, a second body 120, a base 130, and a connecting component 161 are depicted in dashed lines. Besides, components (e.g., a keyboard and a touch pad) located on the first body 110 and covered by the second body 120 are also depicted in dashed lines.

With reference to FIG. 1A, FIG. 1B, and FIG. 2, in the present embodiment, the electronic device 100 mainly includes three parts, i.e., the first body 110, the second body 120, and the base 130. The electronic device 100 may be a notebook computer, wherein the first body 110 is a host of the notebook computer, the second body 120 is a display of the notebook computer, and the second body 120 illustrated in FIG. 1A covers the first body 110. The base 130 serves as a medium connecting the first body 110 and the second body 120.

To be more specific, the second body 120 is pivoted to the base 130 along a first axis X1, and the base 130 is pivoted to the first body 110 along a second axis X2. The first axis X1 intersects the second axis X2, and these two axes may be perpendicular to each other. Therefore, the second body 120 may be rotated relative to the base 130 and the first body 110 around the first axis X1, and the second body 120 and the base 130 may be rotated relative to the first body 110 around the second axis X2. Namely, the second body 120 may be rotated relative to the first body 110 in two different axial directions and thus has good operating flexibility, so as to satisfy various operating needs of users, e.g., different viewing angles or positions or different operating modes.

Although the electronic device 100 provided in the present embodiment is the notebook computer, for instance, it should be mentioned that the disclosure is not limited thereto. According to other embodiments, the electronic device may be a combination of a tablet PC and a dock station.

In the present embodiment, the base 130 includes a first base portion 131 and a second base portion 132 opposite to each other and separated from each other, wherein the second body 120 may be configured with two opposite and separate concave portions for respectively accommodating the first base portion 131 and the second base portion 132; whereby, the integrity of the appearance of the electronic device 100 can be ensured. To be more specific, the first base portion 131 has a first side 131a and a second side 131b connected to each other, wherein the first side 131a intersects the second side 131b, and the two sides can be perpendicular to each other. The second base portion 132 has a third side 132c and a fourth side 132d connected to each other, wherein the third side 132c intersects the fourth side 132d, and the two sides can be perpendicular to each other.

On the other hand, the second body 120 has a pivoting portion 1201, wherein the first side 131a and the third side 132c face each other and respectively face two opposite sides of the pivoting portion 1201. The second side 131b and the fourth side 132d are arranged side by side and located at the two opposite sides of the pivoting portion 1201, and face the same side of the first body 110. For instance, the first side 131a and the third side 132c may be parallel to each other, and the second side 131b and the fourth side 132d may be aligned to each other (i.e., the second side 131b and the fourth side 132d are located on the same straight line). According to other embodiments, an included angle between the first side and the second side of the first base portion and an included angle between the third side and the fourth side of the second base portion may be adjusted according to actual needs. Besides, the first side of the first base portion may be inclined to the third side of the second base portion, and the second side of the first base portion may be misaligned with the fourth side of the second base portion (i.e., the second side and the fourth side are respectively located on different straight lines).

The pivoting connection among the first body 110, the second body 120, and the base 130 is described hereinafter. The electronic device 100 further includes a first shaft structure 150 and a second shaft structure 160, wherein the first shaft structure 150 is configured to be pivoted to the second body 120 and the base 130, and the second shaft structure 160 is configured to be pivoted to the first base portion 131 of the base 130 and the first body 110. Particularly, the first shaft structure 150 includes a first shaft 151 and a second shaft 152 parallel to the first axis X1, wherein the pivoting portion 1201 of the second body 120 is pivoted to the first side 131a of the first base portion 131 through the first shaft 151 and pivoted to the third side 132c of the second base portion 132 through the second shaft 152. On the other hand, the second shaft structure 160 includes a connecting component 161 and a third shaft 162 parallel to the second axis X2, wherein the connecting component 161 is fixed to the first body 110, and the third shaft 162 is pivoted to the second side 131b of the first base portion 131 and the connecting component 161.

In other words, the first shaft 151 and the second shaft 152 are perpendicular to the third shaft 162. Since the first base portion 131 is pivoted the second body 120 and the connecting component 161 fixed to the first body 110 through the two perpendicular shafts, the first base portion 131 can remain still while the second body 120 is rotated relative to the first body 110 around the first axis X1. On the other hand, in the state shown in FIG. 1A, the second base portion 132 is not locked to the first body 110 and thus can be rotated relative to the first base portion 131 and the first body 110 together with the second body 120 around the first axis X1.

Please continue to refer to FIG. 1A, FIG. 1B, and FIG. 2, the electronic device 100 further includes a locking component 170 slidably disposed in the second base portion 132, and at least one portion of the locking component 170 can be slidably moved out of the second base portion 132 and inserted into the first body 110. In other words, when the locking component 170 is disposed in the second base portion 132, the connection between the second base portion 132 and the first body 110 is released or does not exist. By contrast, when one portion of the locking component 170 is disposed in the second base portion 132, and the other portion of the locking component 170 is inserted into the first body 110, the connection between the second base portion 132 and the first body 110 are locked, as shown in FIG. 3 and FIG. 4.

After the connection between the second base portion 132 and the first body 110 are locked, the second base portion 132 is unable to be rotated relative to the first base portion 131 and the first body 110 together with the second body 120 around the first axis X1. At this time, the second body 120 may be rotated relative to the first base portion 131 and the second base portion 132 respectively through the first shaft 151 and the second shaft 152 and thus has good rotating stability. When the connection between the second base portion 132 and the first body 110 is released, the second base portion 132 can be rotated relative to the first base portion 131 and the first body 110 together with the second body 120 around the first axis X1 again.

In the present embodiment, the second base portion 132 is configured with a first latching slot 132A, and the first body 110 is configured with a second latching slot 111 facing the fourth side 132d of the second base portion 132. The locking component 170 is slidably disposed between the fourth side 132d of the second base portion 132 and the first body 110 and configured to slide in the first latching slot 132A and the second latching slot 111. As shown in FIG. 1B and FIG. 2, the locking component 170 is disposed in the first latching slot 132A, and the connection between the second base portion 132 and the first body 110 is released. As shown in FIG. 3 and FIG. 4, one portion of the locking component 170 is disposed in the first latching slot 132A, and the other portion of the locking component 170 is inserted into the second latching slot 111, so as to lock the connection between the second base portion 132 and the first body 110.

For instance, the locking component 170 may be a magnetic latch and configured to be subject to a magnetic force to slide in the first latching slot 132A and the second latching slot 111. To be more specific, the second base portion 132 has a first magnetic component M1 corresponding to the first latching slot 132A, wherein the first magnetic component M1 is embedded in the second base portion 132 and aligned to a bottom of the first latching slot 132A. On the other hand, the first body 110 has a second magnetic component M2 corresponding to the second latching slot 111, wherein the second magnetic component M2 is embedded in the first body 110 and aligned to a bottom of the second latching slot 111.

Particularly, the first magnetic component M1 and the second magnetic component M2 are both configured to generate a magnetic attraction force to the locking component 170. In the state shown in FIG. 2, the first latching slot 132A and the second latching slot 111 are misaligned with each other, the locking component 170 is magnetically attracted by the first magnetic component M1 and is fixed in the first latching slot 132A without being affected by the magnetic attraction force of the second magnetic component M2 nor being moved out of the first latching slot 132A. When the second base portion 132 is not locked to the first body 110, the second base portion 132 cannot be rotated relative to the first base portion 131 and the first body 110 together with the second body 120 around the first axis X1.

For instance, the rotation of the second base portion 132 defines a moving path of the first latching slot 132A, and an opening of the second latching slot 111 is on the moving path of the first latching slot 132A. When the second body 120 is unfolded relative to the first body by an angle α, the first latching slot 132A of the second base portion 132 rotating together with the second base portion 132 is aligned to the second latching slot 111. Since the magnetic attraction force generated by the second magnetic component M2 to the locking component 170 is greater than the magnetic attraction force generated by the first magnetic component M1 to the locking component 170, the locking component 170 is driven to move toward the second magnetic component M2, and one portion of the locking component 170 is moved into the second latching slot 111, as shown in FIG. 3 and FIG. 4.

To ensure the locking component 170 not to structurally interfere with neighboring components during the rotation of the locking component 170 together with the second base portion 132, a length L of the locking component 170 is designed to be less than or equal to a depth D of the first latching slot 132A of the second base portion 132, as shown in FIG. 1B. On the other hand, the locking component 170 has a first end portion 171 facing the first magnetic component M1 and a second end portion 172 opposite to the first end portion 171. In the state shown in FIG. 1B and FIG. 2, the second end portion 172 does not surpass beyond the first latching slot 132A. When the first latching slot 132A is aligned to the second latching slot 111, the second end portion 172 of the locking component 170 faces the second magnetic component M2, and the locking component 170 is subject to the magnetic attraction force of the second magnetic component M2 and is moved toward the second magnetic component M2, so that the second end portion 172 of the locking component 170 is moved into the second latching slot 111 and contacts the bottom of the second latching slot 111; however, the first end portion 171 is still disposed in the first latching slot 132A, as shown in FIG. 3 and FIG. 4.

Therefore, the length L of the locking component 170 need be designed in consideration of the depth D1 of the first latching slot 132A, the depth D2 of the second latching slot 111, and the gap between the first latching slot 132A and the second latching slot 111. When the second end portion 172 of the locking component 170 contacts the bottom of the second latching slot 111, in order to make sure that the first end portion 171 is still disposed in the first latching slot 132A, the length L of the locking component 170 is required to be at least greater than the depth D2 of the second latching slot 111 and further greater than the sum of the gap between the first latching slot 132A and the second latching slot 111 and the depth D2 of the second latching slot 111.

In order to make the electronic device 100 in the state shown in FIG. 4 return to the state shown in FIG. 2, the second magnetic component M2 may be moved away from the bottom of the second latching slot 111 in a direction parallel to the first axis X1 (see FIG. 3). That is, the second magnetic component M2 and the second latching slot 111 are misaligned with each other. In the present embodiment, the electronic device 100 further includes a switch button 180, wherein the switch button 180 is disposed at the first body 110 and can be moved along the direction parallel to the first axis X1. The second magnetic component M2 is slidably disposed in the first body 110 and connected to the switch button 180. Hence, the movement of the switch button 180 can drive the second magnetic component M2 to be aligned to the second latching slot 111 or misaligned with the second latching slot 111, as shown in FIG. 1B, FIG. 3, and FIG. 5.

After the second magnetic component M2 is misaligned with the second latching slot 111, the first magnetic component M1 drives the second end portion 172 of the locking component 170 to be moved out of the second latching slot 111 and drives the first end portion 171 to contact the bottom of the first latching slot 132A again. At this time, the connection between the second base portion 132 and the first body 110 is released, and the second base portion 132 can be rotated relative to the first base portion 131 and the first body 110 together with the second body 120 around the first axis X1 again. For instance, to facilitate users' operations, the switch button 180 may be partially exposed to the first body 110, or the switch button 180 may be driven through electrical control.

When the connection between the second base portion 132 and the first body 110 is released, as shown in FIG. 1 or FIG. 5, it should be mentioned that the second base portion 132 and the second body 120 may be rotated relative to the first body 110 through the first base portion 131 around the second axis X2. Particularly, the first base portion 131 can be rotated relative to the connecting component 161 and the first body 110 through the third shaft 162. After the second body 120 and the base 130 are rotated relative to the first body 110 around the second axis X2 to the right position, the second edge 124 of the second body 120 faces the first edge 112 of the first body 110, and the connecting component 161 is located between the first body 110 and the second body 120, as shown in FIG. 6. At this time, the keyboard of the first body 110 and the display screen of the second body 120 are arranged side by side and face the same side in the space, so as to provide users with different operating modes or assist the users in showing the images in the display screen to others. For instance, the mode in which the second body 120 is rotated relative to the first body 110 around the first axis X1 may be called as a front rotating mode, while the mode in which the second body 120 is rotated relative to the first body 110 around the second axis X2 may be called as a side rotating mode.

This will be discussed with reference to other embodiments below. It should be noted that the reference numerals and a part of the contents in the previous embodiment are used in the following embodiments, in which identical reference numerals indicate identical or similar components, and repeated description of the same technical contents is omitted. For a detailed description of the omitted parts, reference can be found in the previous embodiment, and no repeated description is contained in the following embodiments.

Figure 7A:
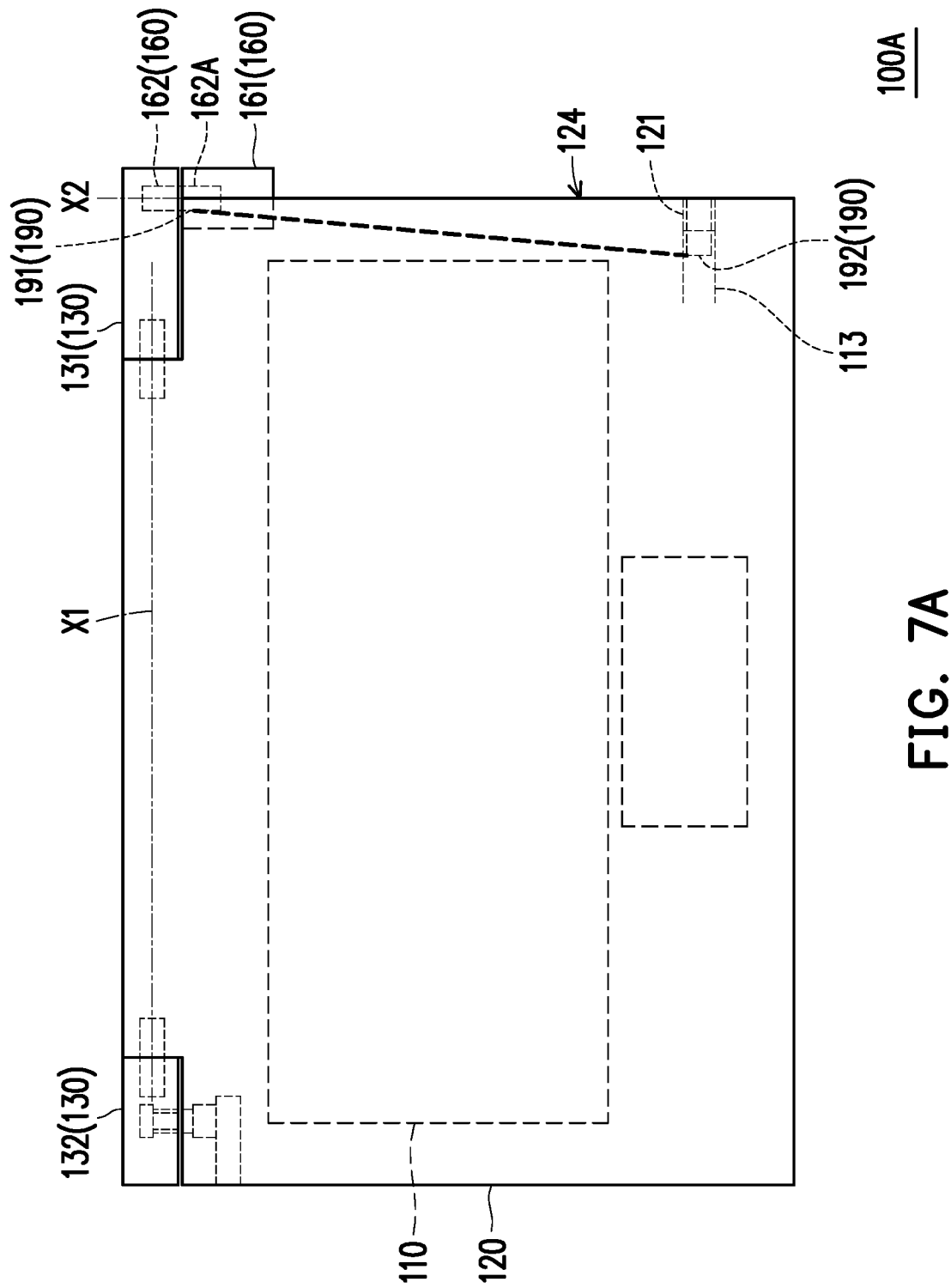
FIG. 7A and FIG. 7B are schematic views of an electronic device in two different states according to a second embodiment of the disclosure.
Figure 7B:
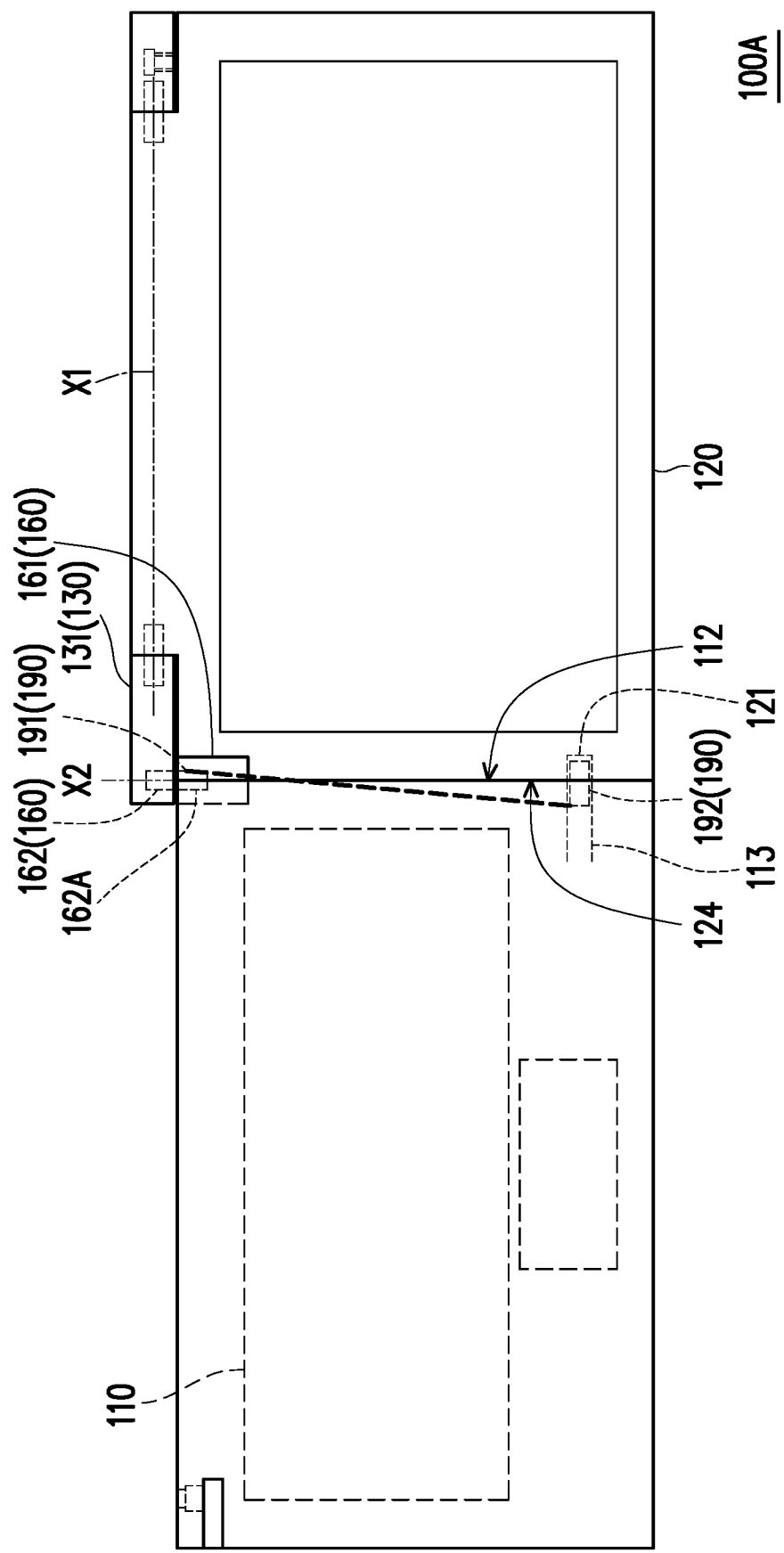

FIG. 7A and FIG. 7B are schematic views of an electronic device in two different states according to a second embodiment of the disclosure. In FIG. 7A and FIG. 7B, it should be mentioned that components located in the body 110, the second body 120, the base 130, and the connecting component 161 are depicted in dashed lines. Besides, in FIG. 7A, components (e.g., a keyboard and a touch panel) located on the first body 110 and covered by the second body 120 are also depicted in dashed lines.

With reference to FIG. 7A and FIG. 7B, the design principle of the front rotating mode and the side rotating mode of the electronic device 100A in the present embodiment is identical or similar to the and the design principle of the front rotating mode and the side rotating mode of the electronic device 100 provided in the first embodiment, and the differences between the two embodiments lie in the electronic device 100A is configured with a locking mechanism as regard to the side rotating mode, and after the second body 120 is rotated relative to the first body 110 around the second axis X2 to the right position, the locking mechanism is applied to lock the second body 120 to the side of the first body 110.

To be more specific, the electronic device 100A further includes a link 190, wherein the link 190 has a connecting end 191 and a latching end 192, and the third shaft 162 has a pivoting portion 162A located in the connecting component 161. The connecting end 191 of the link 190 is connected to the pivoting portion 162A, and the latching end 192 is slidably disposed in the first body 110. While the second body 120 is rotated relative to the first body 110 around the second axis X2, the pivoting portion 162A is rotated relative to the connecting component 161 to drive the link 190, so that the latching end 192 is moved along a direction parallel to the first axis X1.

On the other hand, the second body 120 has a latching hole 121 corresponding to the latching end 192; in the state shown in FIG. 7A, the latching hole 121 is located right above and overlapped with the latching end 192. In the state shown in FIG. 7B, the latching hole 121 is located at a side of the latching end 192 and aligned to the latching end 192; next, at least one portion of the moved latching end 192 is moved out of the first body 110 and inserted into the latching hole 121, so as to lock the second body 120 to the side of the first body 110. At this time, the second body 120 is temporarily unable to be rotated relative to the first body 110, and after the latching end 192 is moved out of the latching hole 121, the second body 120 can be rotated relative to the first body 110 again.

For instance, the first body 110 has the first edge 112 and the sliding groove 113 connected to the first edge 112, wherein the sliding groove 113 is configured to accommodate the latching end 192, and an extending direction of the sliding groove 113 is parallel to the first axis X1. The sliding groove 113 is, for instance, constituted by two opposite grooves or a rail embedded in the first body 110.

On the other hand, the second body 120 has a second edge 124 corresponding to the first edge 112, and the latching hole 121 is connected to the second edge 124. In the state shown in FIG. 7A, the second edge 124 is located right above and overlapped with the first edge 112 (not marked in the drawings because it is covered by the second edge 124). In the state shown in FIG. 7B, the second edge 124 is located at a side of the first edge 112, and the second edge 124 and the first edge 112 face each other. In other words, while the second body 120 is rotated relative to the first body 110 around the second axis X2, the second edge 124 moves from the position right above the first edge 112 of the first body 110 to the side of the first edge 112 of the first body 110. When the second edge 124 faces the first edge 112, the latching end 192 is aligned to and inserted into the latching hole 121.

At this time, the keyboard of the first body 110 and the display screen of the second body 120 are arranged side by side and face the same side in the space, so as to provide the user with different operating modes or assist the user in showing the images in the display screen to others. Besides, after the latching end 192 is inserted into the latching hole 121, the first body 110 and the second body 120 are locked to each other and are arranged side by side along the first axis X1; thus, users are able to directly move the electronic device 100, and the second body 120 would not be rotated relative to the first body 110 nor separated from the first body 110.

To save the configuration space and improve the stability of the second body 120 rotating relative to the first body 110 around the second axis X2, it should be mentioned that the third shaft 162 is located on the second axis X2, and the second axis X2 is overlapped with (or extended to pass through) the first edge 112 of the first body 120 and the second edge 124 of the second body 120.

Figure 8A:
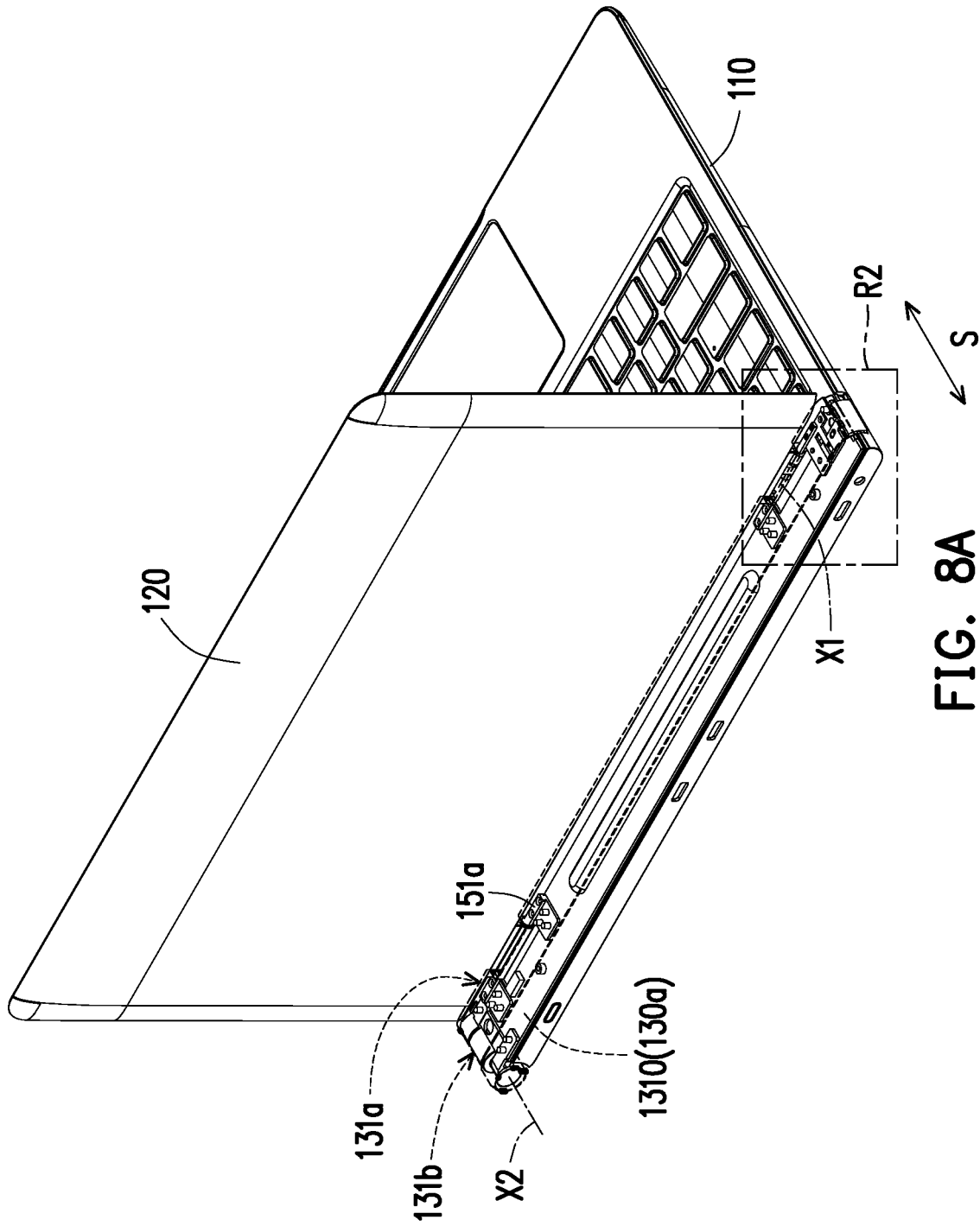
FIG. 8A is a schematic view of an electronic device according to a third embodiment of the disclosure.
Figure 8B:
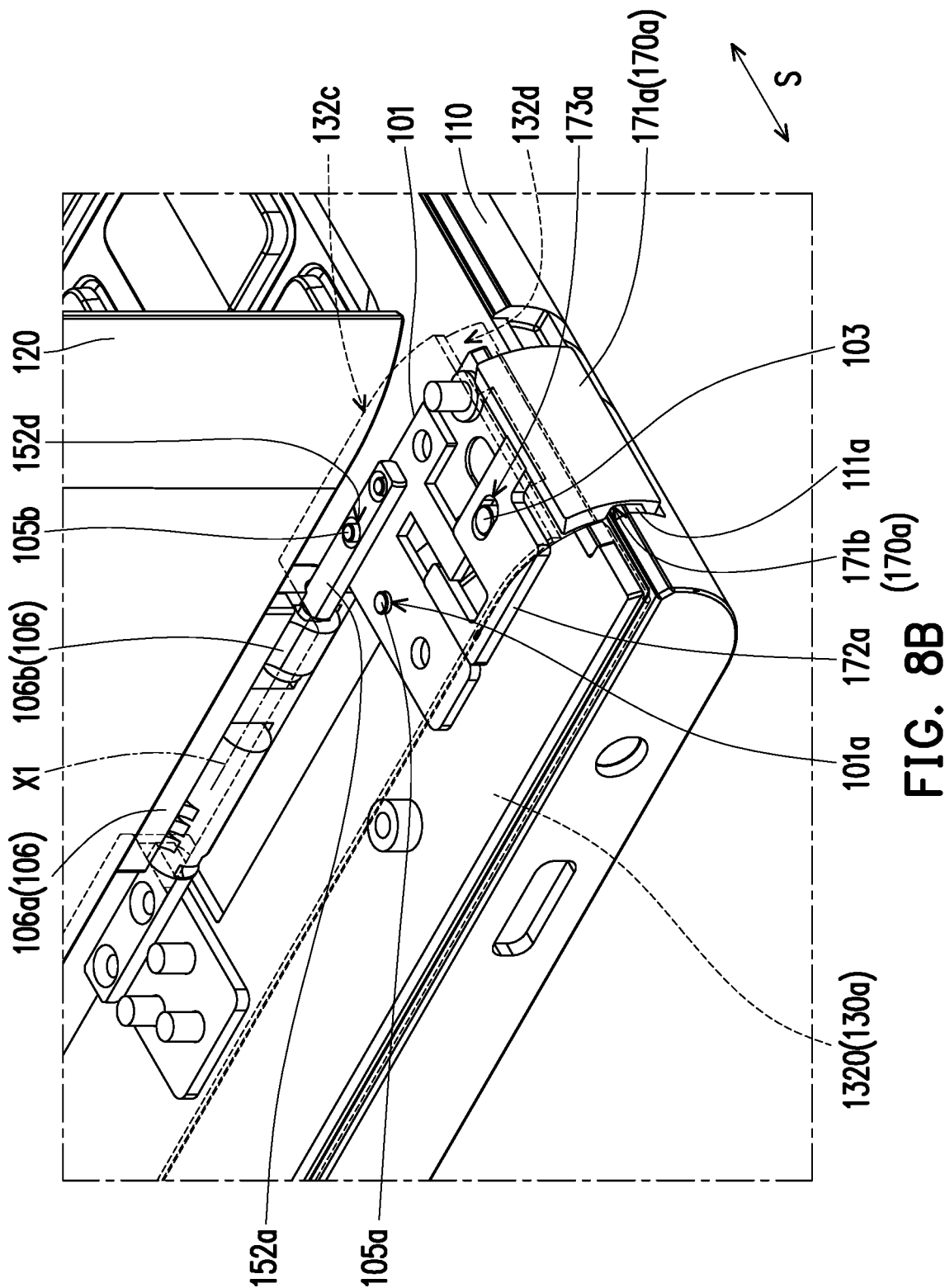
FIG. 8B is a schematic enlarged view of a region R2 depicted in FIG. 8A.
Figure 8C:
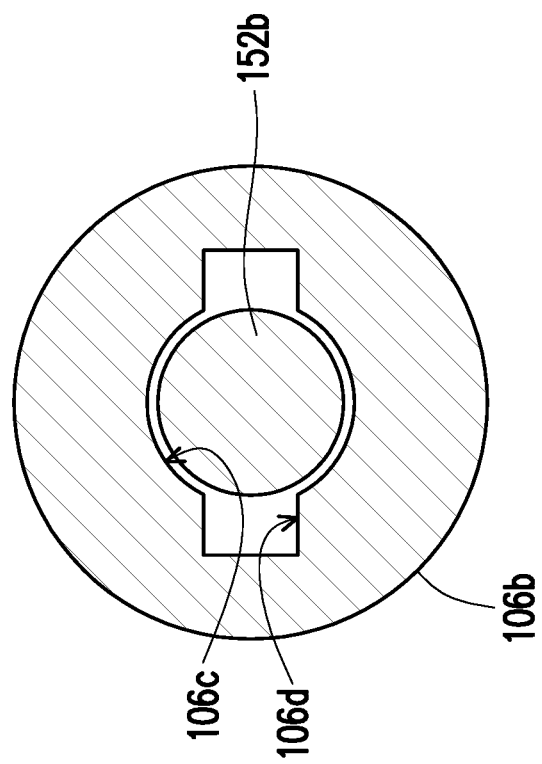
FIG. 8C is a schematic cross-sectional view of the second shaft and the sleeve portion depicted in FIG. 8B.
Figure 8D:
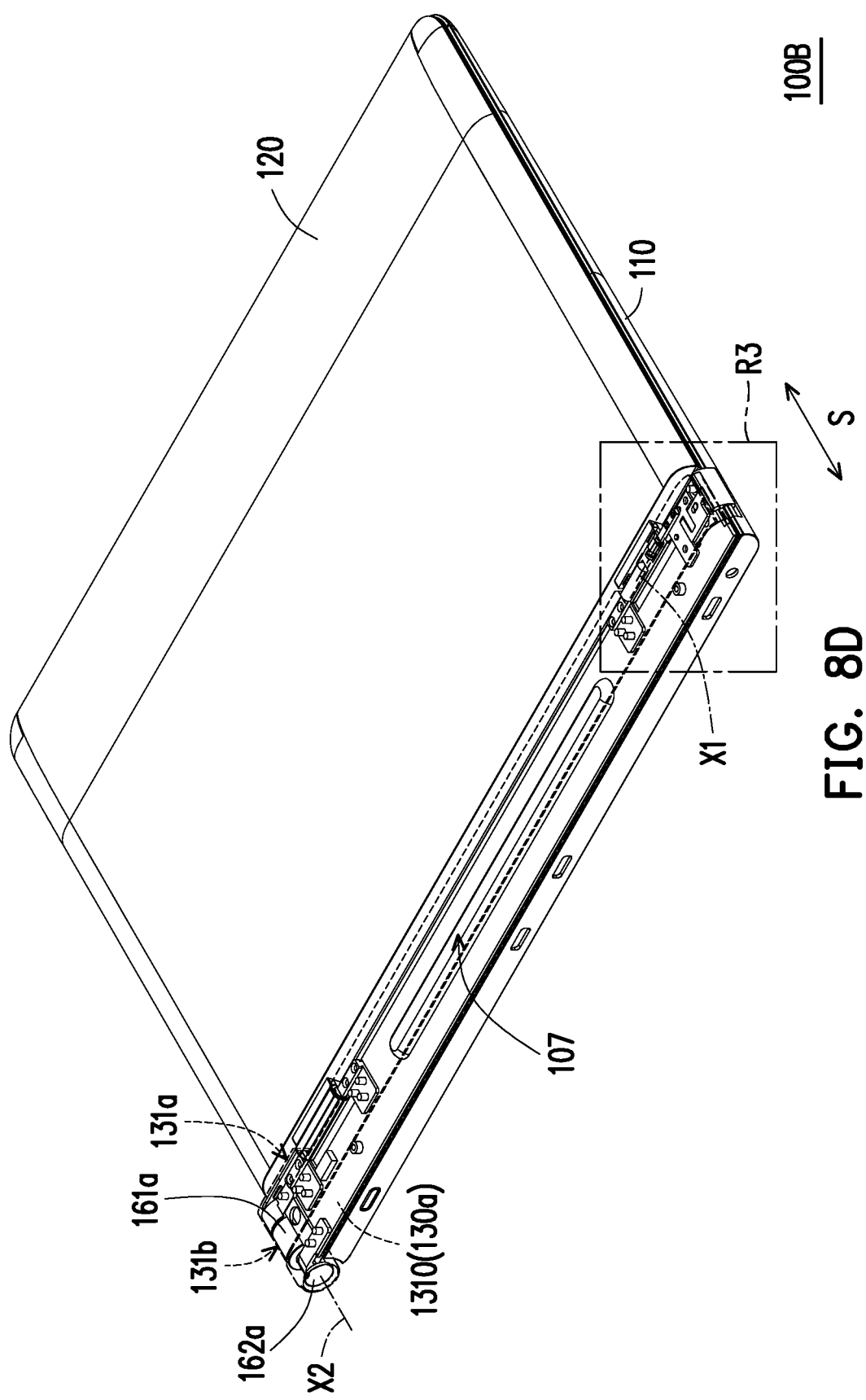
FIG. 8D is a schematic view of the electronic device depicted in FIG. 8A in another state.
Figure 8E:
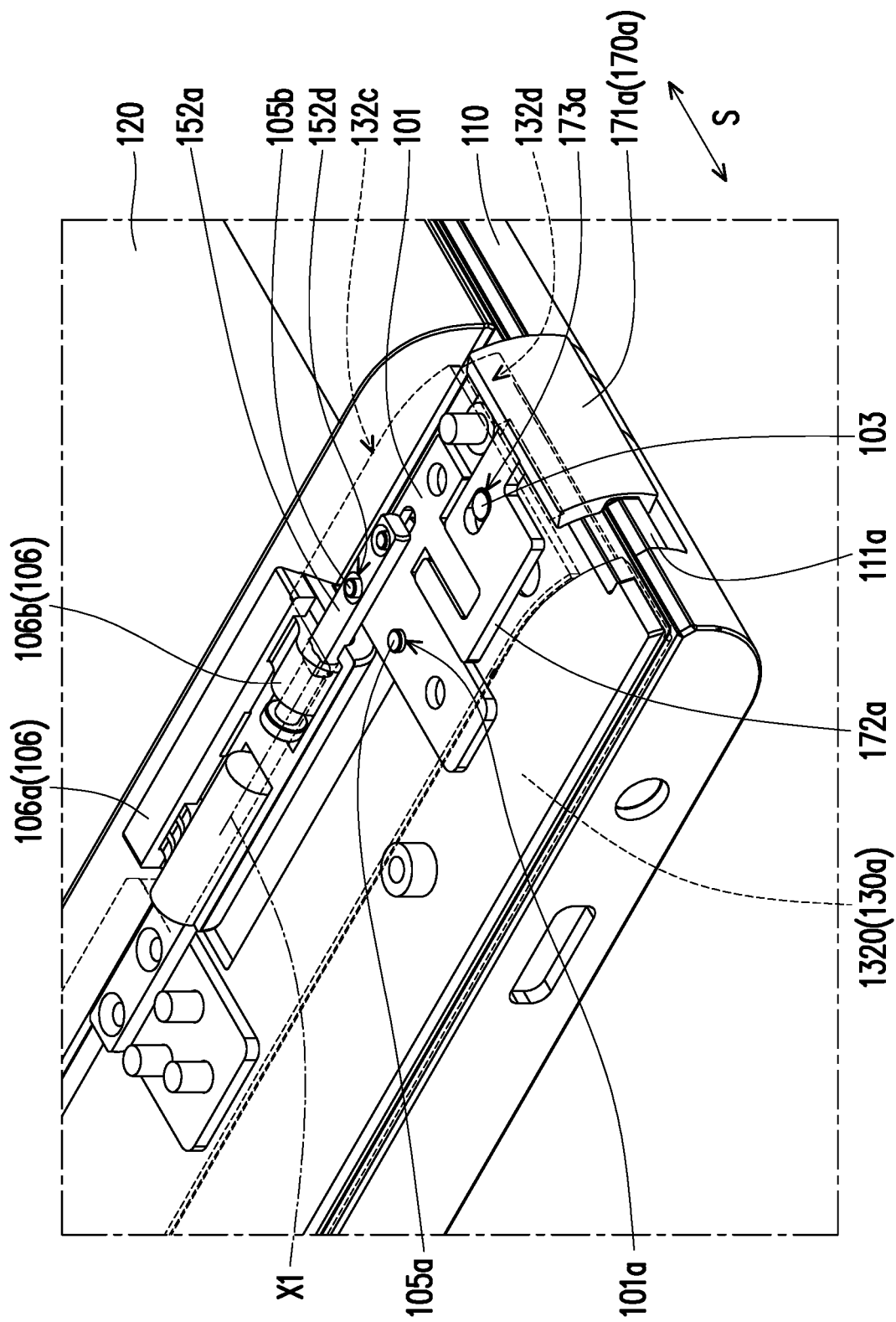
FIG. 8E is a schematic enlarged view of a region R3 depicted in FIG. 8D.
Figure 8F:
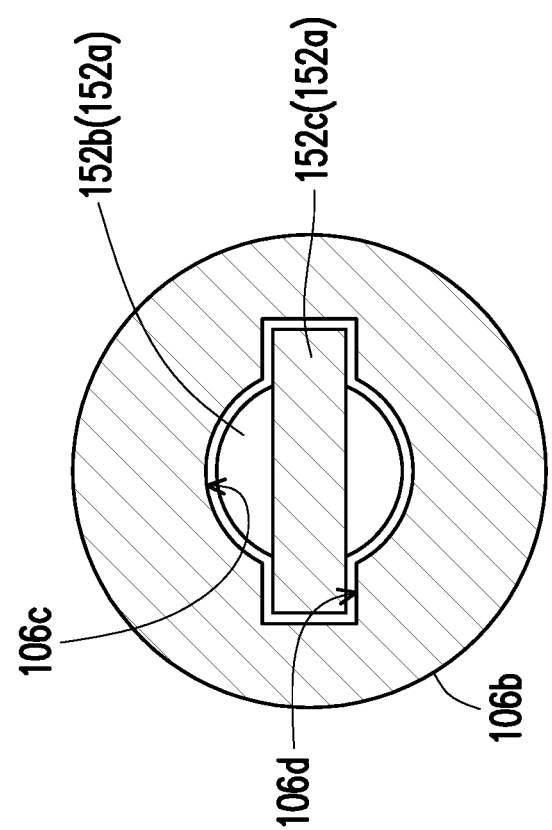
FIG. 8F is a schematic cross-sectional view of the second shaft and the sleeve portion depicted in FIG. 8E.
Figure 8G:
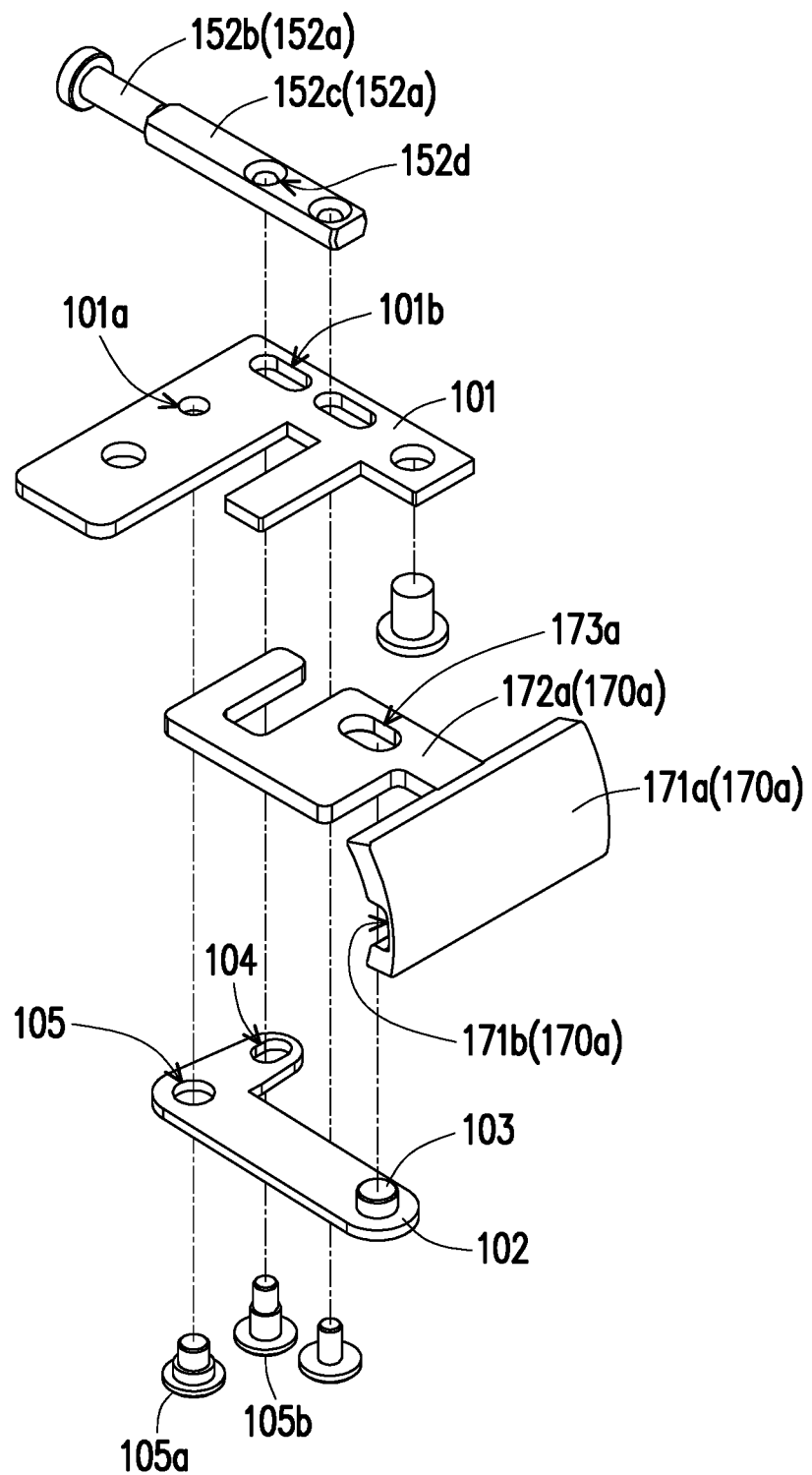
FIG. 8G is a schematic exploded view of the locking component, the second shaft, the positioning plate, and the pushing shaft depicted in FIG. 8D.
Figure 8H:
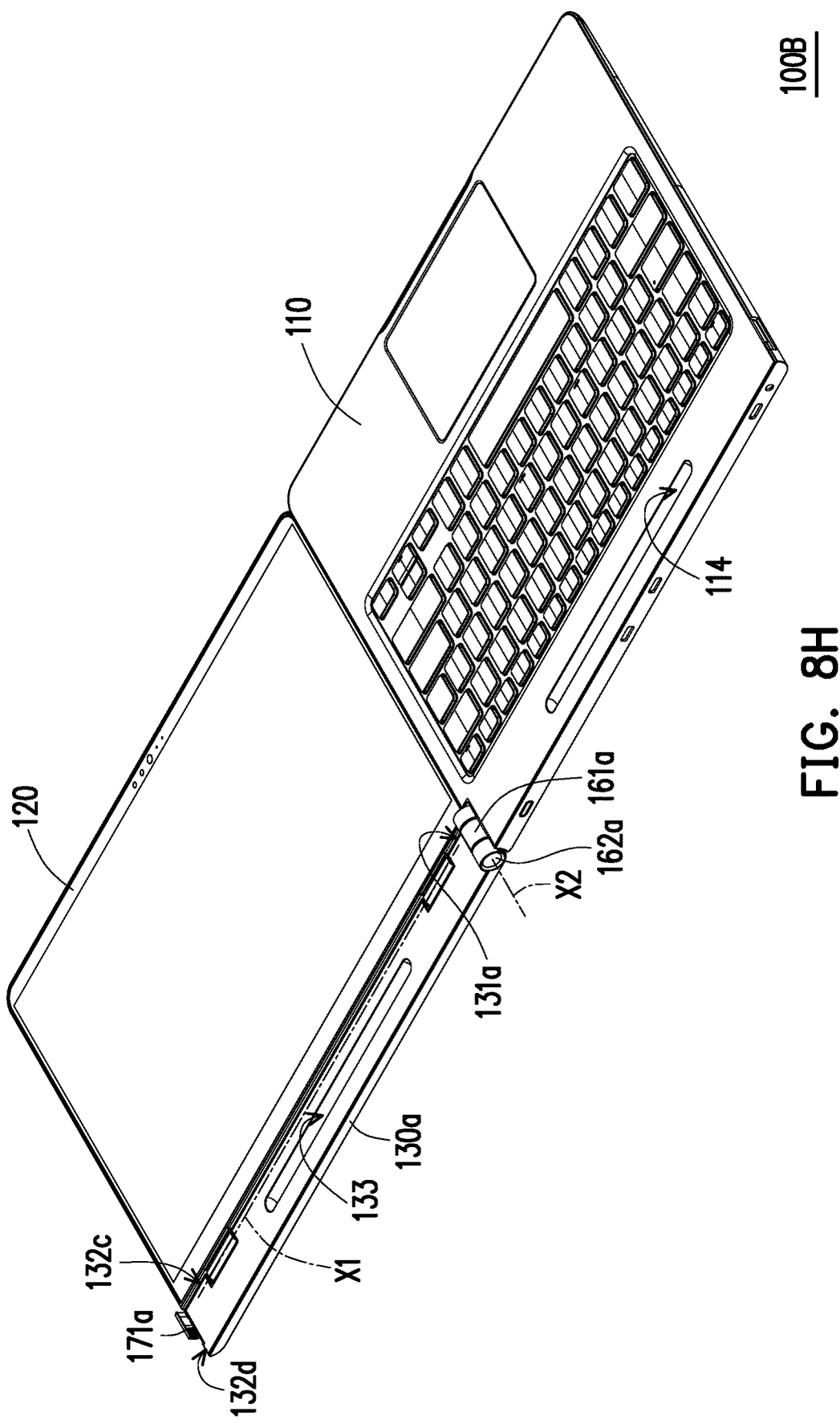
FIG. 8H is a schematic view illustrating the second body and the base depicted in FIG. 8D which are rotated relative to the first body around the second axis and unfolded.
Figure 8I:
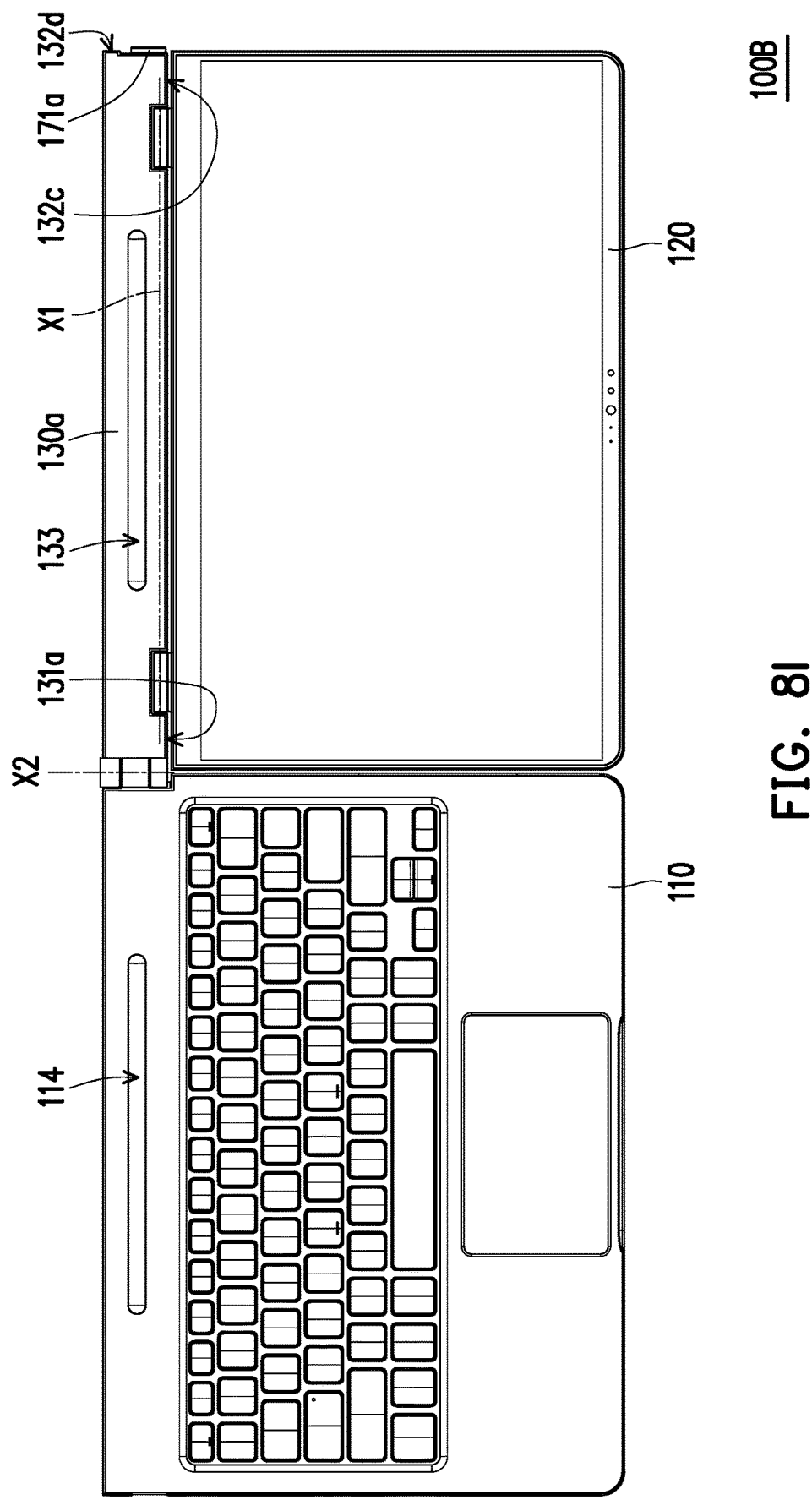
FIG. 8I is a schematic top view of the electronic device depicted in FIG. 8H.

FIG. 8A is a schematic view of an electronic device according to a third embodiment of the disclosure. FIG. 8B is a schematic enlarged view of a region R2 depicted in FIG. 8A. FIG. 8C is a schematic cross-sectional view of the second shaft and the sleeve portion depicted in FIG. 8B. FIG. 8D is a schematic view of the electronic device depicted in FIG. 8A in another state. FIG. 8E is a schematic enlarged view of a region R3 depicted in FIG. 8D. FIG. 8F is a schematic cross-sectional view of the second shaft and the sleeve portion depicted in FIG. 8E. FIG. 8G is a schematic exploded view of the locking component, the second shaft, the positioning plate, and the pushing shaft depicted in FIG. 8D. FIG. 8H is a schematic view illustrating the second body and the base depicted in FIG. 8D which are rotated relative to the first body around the second axis and unfolded. FIG. 8I is a schematic top view of the electronic device depicted in FIG. 8H. It should be mentioned that the base 130a is partially depicted by dashed lines in FIG. 8A, FIG. 8B, FIG. 8D, and FIG. 8E, so as to clearly show the components located in the base 130a or covered by the base 130a.

With reference to FIG. 8A and FIG. 8B, the design principle of the front rotating mode and the side rotating mode of the electronic device 100B in the present embodiment is identical or similar to the design principle of the front flipping mode and the side flipping mode of the electronic device 100 provided in the first embodiment, and the differences between the two embodiments lie in the structural type of the base 130a, the mechanism of releasing the connection between the base 130a and the first body 110 and the mechanism of locking the connection between the base 130a and the first body 110, and the mechanism of stopping the second body 120 from rotating relative to the base 130a around the first axis X1.

First, the base 130a includes a first base portion 1310 and a second base portion 1320 connected to each other, wherein the first side 131a of the first base portion 1310 and the third side 132c of the second base portion 1320 face the second body 120 and are aligned to each other (i.e., the first side 131a and the third side 132c are located on the same straight line). On the other hand, the second side 131b of the first base portion 1310 and the fourth side 132d of the second base portion 1320 are arranged side by side and located at two opposite sides of the base 130a, wherein the second side 131b is connected to the first side 131a, and the fourth side 132d is connected to the third side 132c. For instance, the second side 131b, the first side 131a, the third side 132c, and the fourth side 132d sequentially connected to one another appear to be in a shape of the letter U.

The second body 120 is pivoted to the first side 131a of the first base portion 1310 through the first shaft 151a and pivoted to the third side 132c of the second base portion 1320 through the second shaft 152a. As such, the second body 120 may be rotated relative to the base 130a and the first body 110 through the first shaft 151a and the second shaft 152a around the first axis X1 (i.e., the front rotating mode), and FIG. 8A illustrates that the second body 120 is unfolded relative to the first body 110. With reference to FIG. 8A to FIG. 8D, the second body 120 and the base 130a may be rotate relative to the first body 110 around the second axis X2 (i.e., the side rotating mode). Hence, while the second body 120 is rotated relative to the base 130a and the first body 110 around the first axis X1, to prevent the base 130a which is subject to a force from being separated from the first body 110, the locking component 170a is applied to lock the connection between the base 130a and the first body 110, so that the base 130a can be locked to the first body 110.

Particularly, the locking component 170a has a switch portion 171a, wherein the switch portion 171a is slidably connected to the fourth side 132d of the second base portion 1320, and the switch portion 171a is further extended to a side of the first body which is arranged side by side with the fourth side 132d. In the present embodiment, the first body 110 has a first latching portion 111a corresponding to the fourth side 132d of the second base portion 1320, and the switch portion 171a has a second latching portion 171b facing the first body 110. As shown in FIG. 8B, the second latching portion 171b of the switch portion 171a is latched to the first latching portion 111a of the first body 110, so as to lock the base 130a to the first body 110.

For instance, the first latching portion 111a and the second latching portion 171b may be combination of a concave structure and a convex structure. As shown in FIG. 8B, FIG. 8D, and FIG. 8E, the switch portion 171a can slide back and forth along the sliding direction S perpendicular to the first axis X1, so that the first latching portion 111a and the second latching portion 171b can be latched to each other, or the first latching portion 111a and the second latching portion 171b can be separated from each other. After the first latching portion 111a and the second latching portion 171b are separated from each other, the second body 120 and the base 130a can be rotated relative to the first body 110 around the second axis X2 (i.e., the side rotating mode).

While the second body 120 and the base 130a are rotated relative to the first body 110 around the second axis X2, in order to prevent the second body 120 from rotating relative to the base 130a around the first axis X1, the second shaft 152a may be moved along the first axis X1 along with the sliding movement of the locking component 170a, so that the second body 120 has the degree of freedom for rotating relative to the base 130a around the first axis X1, or the second body 120 is stopped from rotating relative to the base 130a around the first axis X1.

With reference to FIG. 8B to FIG. 8G, the electronic device 100B further includes positioning plate 101 and pushing shaft 102 (FIG. 8G). Here, the positioning plate 101 is fixed in the second base portion 1320, and the third side 132c and the fourth side 132d are located at peripheries of the positioning plate 101. The pushing shaft 102 is movably disposed in the second base portion 1320, wherein the locking component 170a is connected to the second shaft 152a through the pushing shaft 102, and while the locking component 170a moves along the sliding direction S, the pushing shaft 102 is driven to move the second shaft 152a.

In particular, the pushing shaft 102 has a first sliding end 103, a second sliding end 104 opposite to the first sliding end 103, and a pivoting end 105 located between the first sliding end 103 and the second sliding end 104. On the other hand, the locking component 170a further has an extending portion 172a connected to the switch portion 171a, wherein the extending portion 172a is slidably disposed in the second base portion 1320, and the pushing shaft 102 is slidably connected to the extending portion 172a through the first sliding end 103. For instance, the first sliding end 103 may be a pin, and the extending portion 172a has a sliding groove 173a. The sliding groove 173a is configured to accommodate the first sliding end 103 and guide the sliding movement of the first sliding end 103. Besides, the pivoting end 105 is pivoted to the positioning plate 101. Therefore, when the locking component 170a slides and moves the pushing shaft 102 due to the cooperation of the extending portion 172a and the first sliding end 103, the pushing shaft 102 can swing relative to the positioning plate 101 around the pivoting end 105.

Further, the second sliding end 104 is slidably connected to the positioning plate 101 and is connected to the second shaft 152a. When the pushing shaft 102 swings relative to the positioning plate 101 around the pivoting end 105, the second shaft 152a can be driven by the sliding second sliding end 104 to move along the first axis X1. For instance, the positioning plate 101 has a pivoting hole 101a corresponding to the pivoting end 105, wherein the pivoting end 105 may be a through hole; since the first positioning pin 105a passes through the pivoting end 105 and the pivoting hole 101a, the pivoting end 105 and the pivoting hole 101a are positioned, and the pivoting relationship between the pushing shaft 102 and the positioning plate 101 is ensured.

On the other hand, the positioning plate 101 has a sliding groove 101b corresponding to the second sliding end 104, wherein the second sliding end 104 may be a through hole; since the second positioning pin 105b passes through the second sliding end 104 and the sliding groove 101b, the second sliding end 104 and the sliding groove 101b are positioned, and the sliding relationship between the pushing shaft 102 and the positioning plate 101 is ensured. According to other embodiments, the first positioning pin can be directly formed at the pivoting end, and the second positioning pin can be directly formed at the second sliding end 104.

In the present embodiment, the second shaft 152a includes a first shaft portion 152b and a second shaft portion 152c, wherein the second shaft portion 152c is slidably connected to the sliding groove 101b of the positioning plate 101, and the positioning plate 101 is located between the second shaft portion 152c and the pushing shaft 102. Particularly, the second shaft portion 152c has a through hole 152d corresponding to the sliding groove 101b, and the second positioning pin 105b passes through the through hole 152d to position the through hole 152d, the sliding groove 101b, and the second sliding end 104 and ensure the connection between the pushing shaft 102 and the second shaft portion 152c as well as the sliding relationship between the second shaft portion 152c and the positioning plate 101.

As shown in FIG. 8B, FIG. 8C, FIG. 8E, FIG. 8F, and FIG. 8G, the first shaft portion 152b and the second shaft portion 152c has two different geometric contours. The electronic device 100B further includes a connecting base 106, wherein the connecting base 106 includes a fixing portion 106a and the sleeve portion 106b connected to each other, and the sleeve portion 106b is fixed to one side of the second body 120 facing the second base portion 1320 through the fixing portion 106a. On the other hand, the sleeve portion 106b and second base portion 1320 are arranged side by side; for instance, the second base portion 1320 may have accommodation space for accommodating the sleeve portion 106b, so as to ensure the integrity of the appearance of the electronic device 100B.

Particularly, the second shaft 152a movably passes through the second base portion 1320 and the sleeve portion 106b of the connecting base 106, and the sleeve portion 106b has a first hole 106c and a second hole 106d communicating with each other. The first shaft portion 152b and the first hole 106c may be a round shaft and a round hole cooperating with each other, and the second shaft portion 152c and the second hole 106d may be a rectangular shaft and a rectangular hole cooperating with each other.

When the first shaft portion 152b passes through the first hole 106c, and the second shaft portion 152c is located outside the second hole 106d. Based on the cooperation of the round shaft and the round hole, and the rectangular shaft does not pass through the rectangular hole and thus the structural interference between the rectangular shaft and the rectangular hole is not generated, the second body 120 has the degree of freedom for rotating relative to the base 130a, as shown in FIG. 8B and FIG. 8C.

When the switch portion 171a of the locking component 170a moves along the sliding direction S to release the connection between the base 130a and the first body 110, the extending portion 172a and the switch portion 171a simultaneously move along the same direction, and the extending portion 172a drives the pushing shaft 102 to swing relative to the positioning plate 110 around the pivoting end 105. Meanwhile, the second sliding end 104 of the pushing shaft 102 slides along the first axis X1, and the second shaft 152a is driven by the second sliding end 104 to make the second shaft portion 152c pass through the second hole 106d, as shown in FIG. 8D to FIG. 8F.

Owing to the structural interference caused by the rectangular shaft and the rectangular hole, the second body 120 is stopped from rotating relative to the base 130a around the first axis X1. In other words, after the connection between the base 130a and the first body 110 is released, the second body 120 is temporarily not able to be rotated relative to the base 130a around the first axis X1. At this time, the user is able to exert a force on the second body 120, so as to allow the second body 120 and the base 130a to be rotated relative to the first body 110 around the second axis X2, and the second body 120 cannot be rotated relative to the base 130a around the first axis X1.

As shown in FIG. 8D, FIG. 8H, and FIG. 8I, the connecting component 161a is fixed to the first body 110, wherein the first base portion 1310 of the base 130a is pivoted to the connecting component 161a through the third shaft 162a, and the third shaft 162a is arranged corresponding to the second side 131b. When the connection between the base 130a and the first body 110 is released, the user is able to exert a force to the second body 120, so as to allow the second body 120 and the base 130a to be rotated and to be unfolded relative to the first body 110 around the second axis X2. After the second body 120 and the base 130a is rotated relative to the first body 110 around the second axis X2 to the right position, the keyboard of the first body 110 and the second body 120 are arranged side by side and face the same side in the space, so as to provide users with different operating modes or assist the users in showing the images in the display screen to others, as shown in FIG. 8H and FIG. 8I. On the other hand, the connecting component 161a is located between the first body 110 and the second body 120.

Please continue to refer to FIG. 8D, FIG. 8H, and FIG. 8I. The base 130a has a first groove 133, and the first body 110 has a second groove 114 corresponding to the first groove 133. When the second body 120 and the base 130a are unfolded relative to the first body 110 around the second axis X2, the first groove 133 and the second groove 114 are exposed. When the second body 120 and the base 130a cover the first body 110, the first groove 110 and the second groove 114 are aligned to constitute an accommodation groove 107. For instance, the accommodation groove 107 may be configured to accommodate an input device, e.g., a stylus, which should not be construed as a limitation to the disclosure. After the second body 120 and the base 130a are unfolded relative to the first body 110 around the second axis X2, the first groove 133 and the second groove 114 are separated from each other, and the user is able to remove the input device from the first groove 133 or the second groove 114.

To sum up, the second body of the electronic device of the disclosure may be rotated relative to the first body in two different axial directions, and thus the electronic device has good operating flexibility and can satisfy various operating needs of users. To be more specific, the base is disposed between the first body and the second body, and serves as a medium of connecting the first body and the second body. Herein, the second body may be rotated relative to the base and the first body around the first axis, and the second body and the base may be rotated relative to the first body around the second axis. While the second body is rotated relative to the base and the first body around the first axis, the base and the first body can be locked first, so as to prevent the base which is subject to a force from being separated from the first body, whereby the stability of the second body be rotated around the first axis can be improved. On the other hand, before the second body and the base are rotated relative to the first body around the second axis, users may release the connection between the base and the first body through the corresponding operating mechanism, so that the second body is temporarily unable to be rotated relative to the base around the first axis. In other words, the electronic device of the disclosure can be easily operated and has good reliability.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. An electronic device comprising:
a first body;
a second body;
a base, the second body being connected to the first body through the base, wherein the base comprises a first base portion and a second base portion opposite to each other, the first base portion has a first side and a second side intersecting the first side, and the second base portion has a third side and a fourth side intersecting the third side;
a first shaft structure, comprising a first shaft and a second shaft, the second body being pivoted to the first side of the first base portion through the first shaft and pivoted to the third side of the second base portion through the second shaft;
a second shaft structure, comprising a connecting component and a third shaft, wherein the connecting component is fixed to the first body, the third shaft is pivoted to the second side of the first base portion and the connecting component, and the first shaft and the second shaft are perpendicular to the third shaft; and
a locking component, slidably disposed between the fourth side of the second base portion and the first body and configured to lock or release a connection between the second base portion and the first body.

2. The electronic device as recited in claim 1, further comprising:
a first magnetic component, disposed in the second base portion, wherein the second base portion is configured with a first latching slot and the first magnetic component is aligned to the first latching slot, the locking component is a magnetic latch slidably disposed in the first latching slot and configured to be subject to a magnetic attraction force of the first magnetic component so as to be positioned in the first latching slot; and
a second magnetic component, disposed in the first body, wherein the first body is configured with a second latching slot facing the fourth side of the second base portion, and the second magnetic component is aligned to the second latching slot,
when the second base portion is rotated with the second body and aligns the first latching slot to the second latching slot, a magnetic attraction force produced by the second magnetic component to the magnetic latch is greater than a magnetic attraction force produced by the first magnetic component to the magnetic latch, such that a portion of the magnetic latch is moved out of the first latching slot and moved into the second latching slot to lock the connection between the second base portion and the first body.

3. The electronic device as recited in claim 2, wherein a length of the magnetic latch is less than or equal to a depth of the first latching slot of the second base portion, and the length of the magnetic latch is greater than a depth of the second latching slot of the first body.

4. The electronic device as recited in claim 2, wherein the magnetic latch has a first end portion and a second end portion opposite to each other, the first end portion faces the first magnetic component, the second end portion faces the second magnetic component, when the magnetic latch is attracted by the second magnetic component, the second end portion is moved out of the first latching slot and moved into the second latching slot, and the first end portion is located in the first latching slot.

5. The electronic device as recited in claim 2, further comprising: a switch button, movably disposed at the first body and connected to the second magnetic component, and configured to drive the second magnetic component to be misaligned with the second latching slot or to be aligned to the second latching slot.

6. The electronic device as recited in claim 1, further comprising:
a link, having a connecting end and a latching end, wherein the third shaft has a pivoting portion located in the connecting component and the connecting end is connected to the pivoting portion, the latching end is slidably disposed in the first body, and the second body is configured with a latching hole corresponding to the latching end, when the second body and the base are rotated relative to the connecting component and the first body through the third shaft, the pivoting portion of the third shaft rotates relative to the connecting component, such that the connecting end drives at least one portion of the latching end to be moved out of the first body and inserted into the latching hole of the second body.

7. The electronic device as recited in claim 6, wherein the first body has a first edge and a sliding groove connected to the first edge, and the sliding groove is configured to accommodate the latching end, wherein the second body has a second edge corresponding to the first edge, the latching hole is connected to the second edge, and a rotation axis of the third shaft is extended to pass through the first edge and the second edge, after the second body and the base are rotated relative to the connecting component and the first body through the third shaft and aligns the second edge to the first edge, the latching hole is aligned to the sliding groove.

8. The electronic device as recited in claim 1, wherein the locking component has a switch portion slidably connected to the fourth side of the second base, the first body is configured with a first latching portion corresponding to the fourth side of the second base portion, and the switch portion is configured with a second latching portion facing the first body and configured to be latched to or separated from the first latching portion.

9. The electronic device as recited in claim 8, further comprising:
a positioning plate, fixed in the second base portion; and
a pushing shaft, movably disposed in the second base portion, wherein the pushing shaft has a first sliding end, a second sliding end opposite to the first sliding end, and a pivoting end located between the first sliding end and the second sliding end, and the locking component further has an extending portion connected to the switch portion and located in the second base portion,
wherein the first sliding end is slidably connected to the extending portion, the pivoting end is pivoted to the positioning plate, and the second sliding end is slidably connected to the positioning plate and connected to the second shaft.

10. The electronic device as recited in claim 9, further comprising:
- a connecting base, comprising a fixing portion and a sleeve portion, wherein the fixing portion is fixed to the second body, and the sleeve portion and the second base portion are arranged side by side,
- wherein the second shaft movably passes through the second base portion and the sleeve portion of the connecting base.

11. The electronic device as recited in claim 10, wherein the second shaft comprises a first shaft portion and a second shaft portion, the sleeve portion has a first hole cooperating with the first shaft portion and a second hole cooperating with the second shaft portion, and the first hole communicates with the second hole,
- when the first shaft portion passes through the first hole and the second shaft portion is located outside the second hole, the second body has a degree of freedom for rotating relative to the base, and
- when the second shaft portion passes through the second hole, the second body is prevented from rotating relative to the base.

12. The electronic device as recited in claim 1, wherein the first side of the first base portion and the third side of the second base portion are arranged side by side, and the second side of the first base portion and the fourth side of the second base face the second body.

13. The electronic device as recited in claim 1, wherein the first side of the first base portion and the third side of the second base portion face the second body, and the second side of the first base portion and the fourth side of the second base are arranged side by side.

14. The electronic device as recited in claim 1, wherein the base has a first groove, the first body has a second groove corresponding to the first groove, and when the second body and the base cover the first body, the first groove and the second groove are aligned with each other and constitute an accommodation groove.

* * * * *